US006965894B2

(12) United States Patent
Leung et al.

(10) Patent No.: US 6,965,894 B2
(45) Date of Patent: Nov. 15, 2005

(54) EFFICIENT IMPLEMENTATION OF AN INDEX STRUCTURE FOR MULTI-COLUMN BI-DIRECTIONAL SEARCHES

(75) Inventors: Ting Y. Leung, San Jose, CA (US); Kar Ming Tang, San Francisco, CA (US); Thanh Tan Pham, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 10/104,684

(22) Filed: Mar. 22, 2002

(65) Prior Publication Data

US 2003/0182272 A1 Sep. 25, 2003

(51) Int. Cl.$^7$ .............................................. G06F 17/30
(52) U.S. Cl. ........................................... 707/10; 707/3
(58) Field of Search ................... 707/1–10, 100–104.1, 707/200–205

(56) References Cited

U.S. PATENT DOCUMENTS

| | | | |
|---|---|---|---|
| 3,602,895 A | | 8/1971 | Loizides |
| 5,590,324 A | | 12/1996 | Leung et al. |
| 5,644,763 A | | 7/1997 | Roy |
| 5,875,445 A | * | 2/1999 | Antonshenkov ............... 707/2 |
| 5,973,698 A | | 10/1999 | Suzuki et al. |
| 6,175,835 B1 | * | 1/2001 | Shadmon .................... 707/102 |
| 6,704,728 B1 | * | 3/2004 | Chang et al. ................ 707/5 |

FOREIGN PATENT DOCUMENTS

| | | |
|---|---|---|
| JP | 4156624 A | 5/1992 |
| JP | 9062696 A | 3/1997 |
| JP | 2001134598 A | 5/2001 |
| JP | 10233788 A | 6/2001 |

OTHER PUBLICATIONS

John C. Schettino, Jr., "Extending Windows CE 2.0 MFC Database Classes", *Dr. Dobb's Journal*, May 1998, pp. 70,72,74,75,110, and 111.
Boykin et al., 1989, "IBM Technical Disclosure Bulletin," 32(5A):291–295.

* cited by examiner

*Primary Examiner*—Mohammad Ali
(74) *Attorney, Agent, or Firm*—Gates & Cooper LLP

(57) ABSTRACT

An index structure for use by a database management system comprises a variant of a Patricia tree, wherein each node stores a column value that identifies a specified column of the constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

48 Claims, 9 Drawing Sheets

EFFICIENT IMPLEMENTATION OF AN INDEX STRUCTURE FOR MULTI-COLUMN BI-DIRECTIONAL SEARCHES

BACKGROUND OF THE INVENTION

1. Field of the Invention

This invention relates in general to database management systems performed by computers, and in particular, to the efficient implementation of an index structure for multi-column bi-directional searches.

2. Description of Related Art

Data in an Relational DataBase Management System (RDBMS) is organized into one or more tables that are comprised of rows and columns of data, wherein the rows are records and the columns are attributes. A database will typically have many tables and each table will typically have multiple records and multiple attributes. Users formulate relational operations on the tables, rows and columns, either interactively, in batch files, or embedded in host languages, such as C and COBOL.

It is common for indexes to be used to search the records and attributes in a table. Generally, indexes are comprised of values from one or more columns from the table with pointers to the rows in the table associated with those columns. It may be necessary for applications to specify different orderings of columns in the result table. However, to be performed efficiently, this database operation usually requires that the index be created in manner that supports such orderings, especially where the index is comprised of multiple columns of attributes from the table, and the index search is performed in an ascending manner on one column and in a descending manner on another column. Otherwise, sorting may be necessary, which is an expensive function.

There remains, however, a need in the art for new techniques for creating indexes for data files, especially indexes that are flexible in the manner in which they can be searched. The present invention provides these needed techniques.

SUMMARY OF THE INVENTION

To overcome the limitations in the prior art described above, and to overcome other limitations that will become apparent upon reading and understanding the present specification, the present invention discloses an index structure for use by a database management system. The index structure comprises a variant of a Patricia tree, wherein each node stores a column value that identifies a specified column of the constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
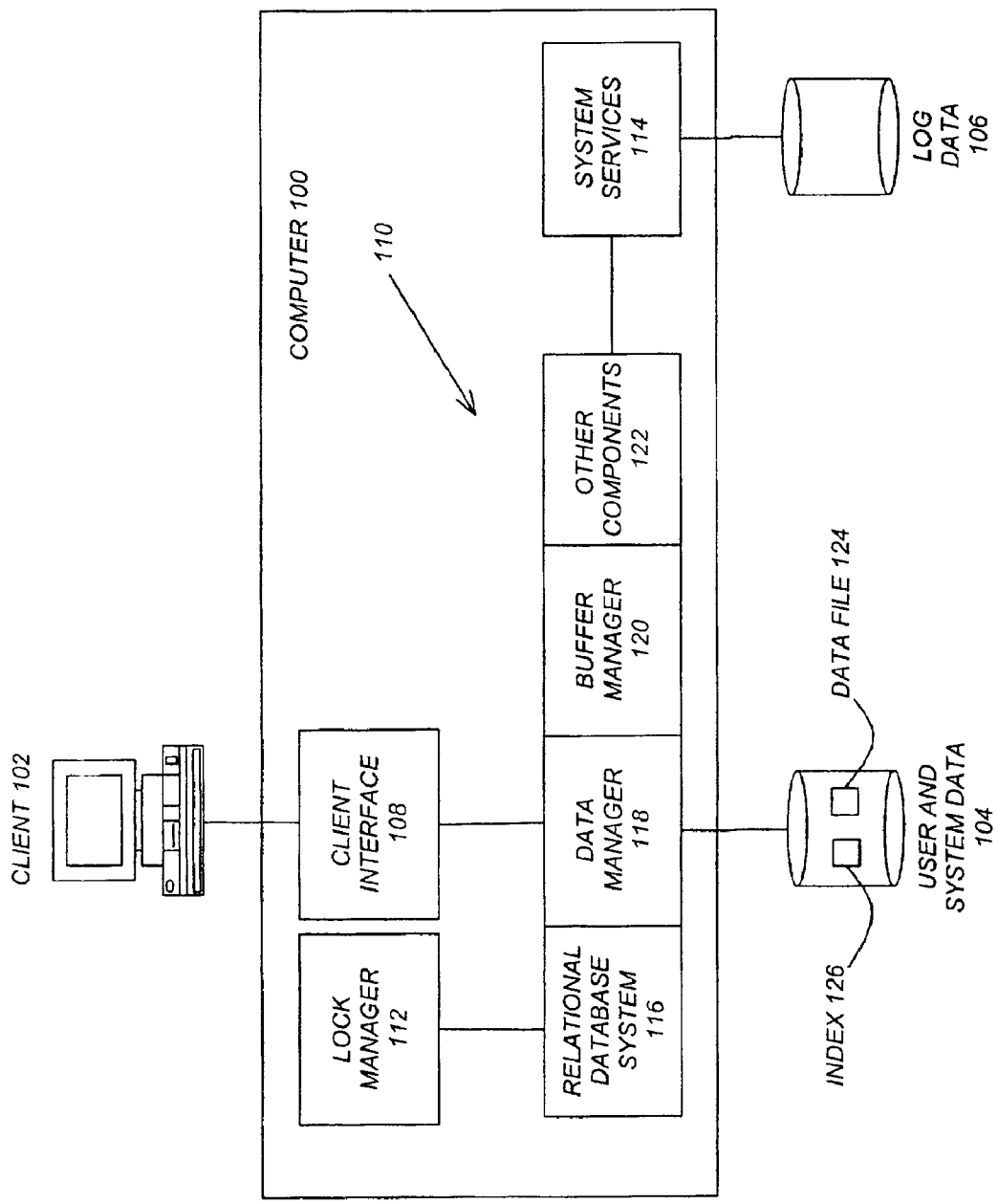
FIG. 1 illustrates an exemplary hardware and software environment that could be used in the preferred embodiment of the present invention.

FIG. 1 illustrates an exemplary hardware and software environment that could be used in the preferred embodiment of the present invention. In the exemplary environment, a computer system 102 is comprised of one or more processors connected to one or more data storage devices 104 and 106, such as disk drives, that store one or more relational databases.

Operators of the computer system 102 use a standard operator interface 108, such as IMS/DB/DC, CICS, TSO, WINDOWS, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by an Relational DataBase Management System (RDBMS) 110. In the preferred embodiment of the present invention, the RDBMS 110 comprises the DB2 Everyplace (DB2e) product offered by IBM Corporation, the assignee of the present invention. Those skilled in the art will recognize, however, that the present invention has application to any RDBMS 110.

As illustrated in FIG. 1, the RDBMS 110 includes a number of major modules, including the Resource Lock Manager (RLM) 112, the Systems Services module 114, the Relational Database System (RDS) 116, the Data Manager 118, and the Buffer Manager 120, as well as other components 122, such as an SQL compiler/interpreter. These modules handle locking services, the overall execution environment, the functions of the SQL language, access control, as well as the retrieval and update of user and system data.

The RDBMS 110 also includes user and system data 104, as well as log data 106. The user data 104 may be comprised of one or more data files 124 and one or more indexes 126 for that data file 124. The data file 124 comprises a table that includes rows (records) and columns (attributes) of data. The index 126 may be comprised of a plurality of entries, wherein each of the entries comprises one or more columns from the data file 124 and one or more pointers to records in the data file 124 that are associated with the entry in the index 126. In the preferred embodiment, the index 126 is a variant of a Patricia tree structure, which is described in more detail below, that provides the capability for performing multi-column, bi-directional searches.

Generally, the RDBMS 110 comprises instructions and/or data, and are embodied in or retrievable from a computer-readable device, medium, or carrier, e.g., a memory, a data storage device, a remote device coupled to the computer 102 by a data communications device, etc. Moreover, these instructions and/or data, when read, executed, and/or interpreted by the computer 102, cause the computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Description of the Index Structure

As noted above, the present invention discloses an efficient implementation of an index 126 structure for multi-column, bi-directional searches in the RDBMS 110. The operation of the present invention can best be understood in context, i.e., using examples, such as searches performed by the RDBMS 110.

Consider the following table, which stores simple sales/revenue information such as sales person name, customer name, potential and actual sales volumes:

CREATE TABLE SALES (PERSON VARCHAR (20), CUSTOMER VARCHAR (20), POTENTIAL_VOL DECIMAL (10,2), ACTUAL_VOL DECIMAL (10,2))

Queries performed by the RDBMS 110 may request rows in different orders. For example:

| Query A: | SELECT* FROM SALES ORDER BY POTENTIAL_VOL DESC, ACTUAL_VOL DESC |
| Query B: | SELECT * FROM SALES ORDER BY POTENTIAL_VOL DESC, ACTUAL_VOL ASC |

When performed by the RDBMS 110, Query A returns rows in both descending order on columns POTENTIAL_VOL and ACTUAL_VOL, revealing which high potential customers placed the most actual sales. Query B returns rows in descending order on column POTENTIAL_VOL and ascending order on column ACTUAL_VOL, revealing which high potential customers indeed had small revenue opportunity. In general, an ORDER BY clause requires the RDBMS 110 to sort qualified rows in specified orders, and sorting is an expensive operation that many RDBMS 110 attempt to optimize.

A typical optimization technique is to find an appropriate index so that the order can be satisfied by retrieving rows via the index order. For example, suppose the following index had been created:

IDX: CREATE INDEX IDX
ON SALES (POTENTIAL_VOL DESC, ACTUAL_VOL DESC)

By traversing the index IDX in descending order on both columns, rows can be retrieved from the base table SALES and yet satisfy the ORDER BY requirement of Query A. However, the index IDX cannot be used to answer Query B, because the existing index structure (which may be a B-tree or hash index or other structure) does not allow the index to be traversed in the <POTENTIAL_VOL DESC, ACTUAL_VOL ASC> order, when the index was constructed with a specification using the <POTENTIAL_VOL DESC, ACTUAL_VOL DESC> order. Hence, there is a need to further extend the RDBMS 110, so that an index can be used to answer queries with any ORDER BY requirements.

Consider a generic example table with 16 rows created by the following SQL statement:

CREATE TABLE T (A INT, B INT, C CHAR(10))

An example table containing 15 rows is shown below:

TABLE T

| A | B | C |
|---|---|---|
| 0 | null | 'a' |
| null | null | 'b' |
| null | 0 | 'c' |
| null | 16 | 'd' |
| 2 | 2048 | 'e' |
| 2 | 2048 | 'f' |
| 2 | 2048 | 'g' |
| 2 | 128 | 'h' |
| 2 | 1024 | 'i' |
| 1 | 16 | 'j' |
| 1 | null | 'k' |
| 1 | 4096 | 'l' |
| 1 | 1024 | 'm' |
| 0 | 0 | 'n' |
| 0 | 1024 | 'o' |

Figure 2:
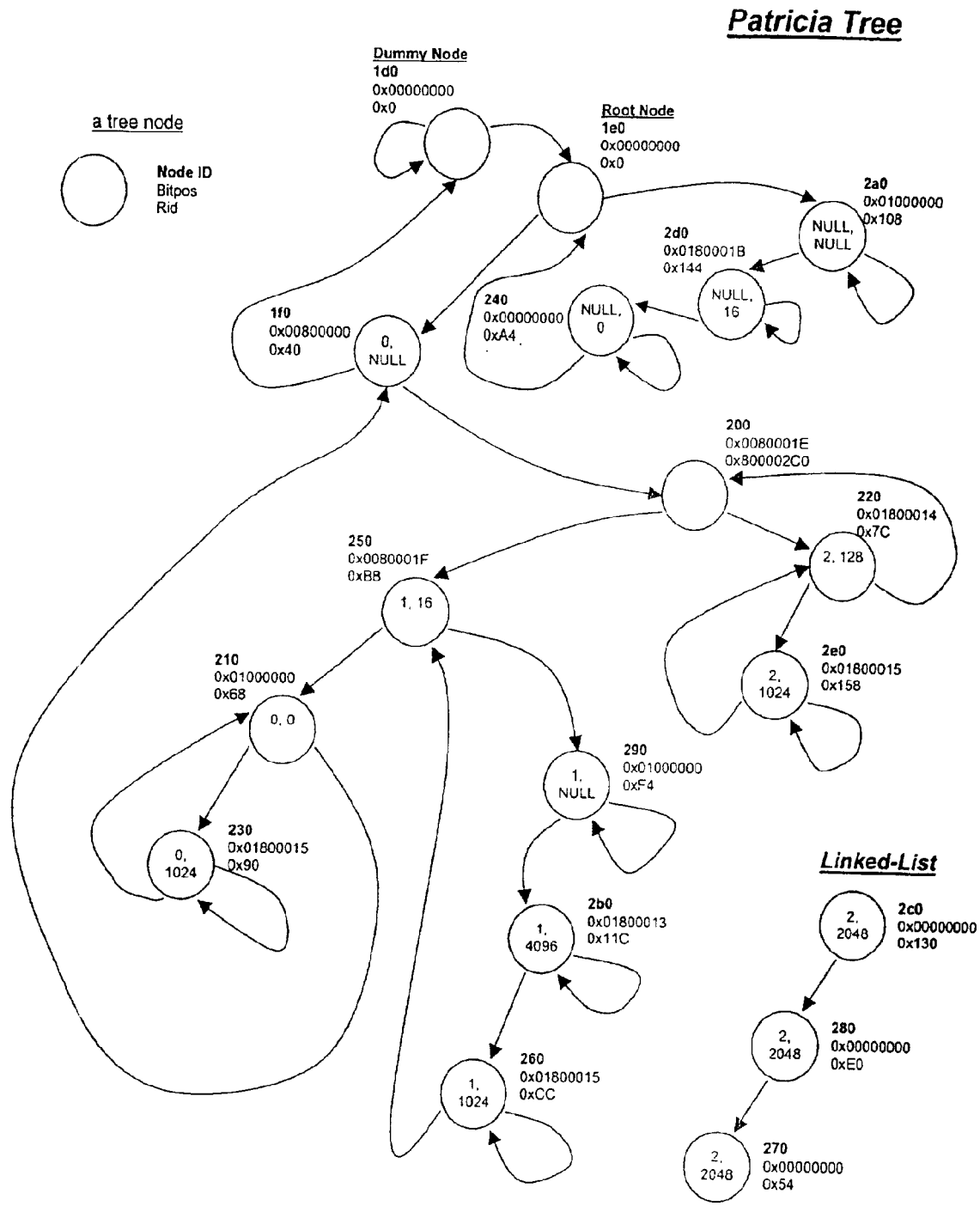
FIG. 2 illustrates a variant of a Patricia (Practical Algorithm to Retrieve Information Coded in Alphanumeric) tree that represents an index for a table T on columns A and B (in that order) according to a preferred embodiment of the present invention.

FIG. 2 illustrates a variant of a Patricia (Practical Algorithm to Retrieve Information Coded in Alphanumeric) tree that represents an index for the table T on columns A and B (in that order) according to a preferred embodiment of the present invention. A Patricia tree is a compact representation of a tree that nominates (by storing its position in the node) which element of the search key will next be used to determine the branching.

In the preferred embodiment, each node of the Patricia tree contains an n-column index value. In the example of FIG. 2, the n-column index value comprises a 2-column storing index values from columns A and B of table T. Each node also contains pointers to the downward left and right paths to subordinate or child nodes (wherein the paths are self-referential when empty).

FIG. 2 also illustrates an exemplary tree node (in the upper left corner). Each node is identified by a node ID and includes a left child pointer, a right child pointer, a bitpos value and Rid (record id) value (shown as labels adjacent the nodes in FIG. 2). The bitpos and Rid values are described in more detail below in conjunction with FIG. 3.

In addition, FIG. 2 illustrates an exemplary linked list (in the lower right corner). If nodes referencing duplicated values are added to the tree, a linked list containing these nodes will be formed. A node in the Patricia tree will then have its Rid pointing to the head of the linked list instead of a record in the data file. Moreover, adjacent each of these nodes is the node ID, as well as a bitpos value and Rid value. Each node in the linked list has only one of its pointers pointing to the next node.

Figure 3:
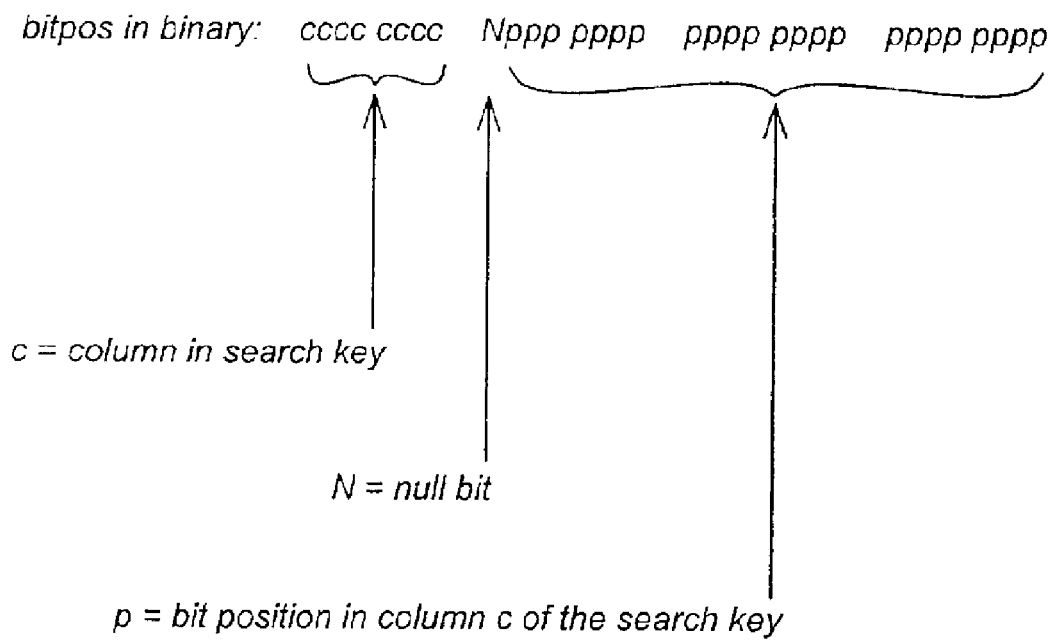
FIG. 3 illustrates the structure of the bitpos (bit position) value found in each node of the Patricia tree according to the preferred embodiment of the present invention.

FIG. 3 illustrates the structure of the bitpos (bit position) value found in each node of the Patricia tree according to the preferred embodiment of the present invention. The bitpos values in the nodes of the Patricia tree are formatted in a manner that allows bi-directional searches by specifying the type of bit-wise comparison made of a search key.

In the preferred embodiment, the bitpos is a 32-bit integer that contains three kinds of information, i.e., a column value c (bits 0–7), a null value N (bit 8) and a bit position value p (bits 9–31).

The column value c specifies which column of the search key is to be examined, beginning from left to right in the creation of the search key, and therefore column A (the first column of the search key) is column 0 and column B (the second column of the search key) is column 1, in the above example.

The null value N specifies whether the value of a bit within column c or the entire column c of the search key is used to decide the next path taken, wherein the bit value or the column value will be used if the null value N is 1 or 0, respectively. In the case of column value comparisons, the left path will be taken if and only if column c of the search key is not null; otherwise, the right path will be taken.

In case of bit value comparison, the bit position value p specifies a portion of the specified column c of the search key to be used, i.e., the bit within column c to be used, from left to right beginning from a $0^{th}$ bit position, to determine the next path taken through the tree when the actual data value of the specified column c of the search key is used to determine the next path taken through the tree. If the bit of the specified column c of the search key is 1, then the tree is traversed downward from the node via the node's right path; otherwise, if the bit of the specified column c of the search key is 0, then the tree is traversed downward from the node via the node's left path.

Figure 4:
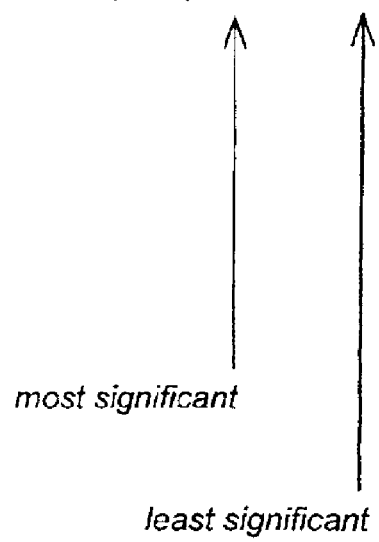
FIG. 4 illustrates a 2-column search key built by the relational database management system according to the preferred embodiment of the present invention.

FIG. 4 illustrates a 2-column search key built by the RDBMS 110 according to the preferred embodiment of the present invention. In this example, assume that the search of the Patricia tree is to be performed for any rows satisfying the 2-column search key (A=2, B=2048). In this example, the 2 columns in the search key are shown as two 32-bit integer values, wherein the leading 0x indicates a hexadecimal value and the following 8 hexadecimal digits represent the search key values. The first 32-bit integer value represents A=2 and the second 32-bit integer value represents B=2048.

In each of the two columns in the search key, the most significant (i.e., left most) bit has a value of 1 for positive integers and a value of 0 for negative integers. During the traversal of the Patricia tree, the two columns in the search key will be examined by the RDBMS 110 according to the nodes' bitpos values, in the sequence from the most to the least significant bits, wherein the most significant bit is the $0^{th}$ bit, the second most significant bit is the $1^{st}$ bit, and so on. This examination will then determine how the Patricia tree is traversed.

The search by the RDBMS 110 starts at the root node, and its bitpos value is used to determine how the search key should be examined. In the example of FIG. 2, the bitpos at the root node is 0x00000000, wherein the leading 0x indicates a hexadecimal value and the following 00000000 are a hexadecimal bitpos value formatted according to FIG. 3. The column value c is 0, meaning that the first column of the search key is to be examined. The null value N is 0, meaning that the decision will be made upon the entire value of the first column of the search key. In this example, column 0 of the first column of the search key is not null, so the left path will be taken by the RDBMS 110.

The traverse of the left path by the RDBMS 110 arrives at node 1/0, which has a bitpos value of 0x00800000, wherein the leading 0x indicates a hexadecimal value and the following 00800000 are a hexadecimal bitpos value formatted according to FIG. 3. The column value c is 0, meaning that the first column of the search key is to be examined. The null value N is 1 and the bit position value p is 0, meaning that the decision will be made using the $0^{th}$ bit of the first column of the search key. In this example, the $0^{th}$ bit of the first column of the search key is 1, so the right path from this node is traversed by the RDBMS 110.

The traverse of the right path by the RDBMS 110 arrives at node 200, which has a bitpos value of 0x0080001E, wherein the leading 0x indicates a hexadecimal value and the following 0080001E are a hexadecimal bitpos value formatted according to FIG. 3. The column value c is 0, meaning that the first column of the search key is to be examined. The null value N is 1 and the bit position value p is $1E_{16}$, or $30_{10}$, meaning that the decision will be made using the $30^{th}$ bit of the first column of the search key. In this example, the $30^{th}$ bit of the first column of the search key is 1, so the right path from this node is traversed by the RDBMS 110.

The traverse of the right path by the RDBMS 110 arrives at node 220, which has a bitpos value of 0x01800014, wherein the leading 0x indicates a hexadecimal value and the following 01800014 are a hexadecimal bitpos value formatted according to FIG. 3. The column value c is 1, meaning that the second column of the search key is to be examined. The null value N is 1 and the bit position value p is $14_{16}$, or $20_{10}$, meaning that the decision will be made using the $20^{th}$ bit of the second column of the search key. In this example, the $20^{th}$ bit of the second column of the search key is 1, so the right path from this node is traversed by the RDBMS 110.

The traverse of the right path by the RDBMS 110 arrives back at node 200. The search by the RDBMS 110 stops at node 200, because that node has already been visited. All nodes include an Rid value that indicate the record id of the record associated with the node, or alternatively, the first node of a linked list of nodes associated with the node, in the case of duplicated values. The most significant bit of the Rid value indicates whether it represents the first node of a linked list (a value of 1) or the record id (a value of 0).

In the example, the Rid value is 0x800002c0, wherein the most significant bit is 1, indicating that the Rid represents a linked list, and the head of the list is located at node 2c0. Node 2c0 is read by the RDBMS 110 and its Rid value is 0x00000130, wherein the most significant bit is 0, indicating that the Rid represents a record id, and the actual record associated with the record id is read by the RDBMS 110 from the data file. The RDBMS 110 traverses the linked list, from node 2c0, to node 280. Node 280 is read by the RDBMS 110 and its Rid value is 0x000000E0, wherein the most significant bit is 0, indicating that the Rid represents a record id, and the actual record associated with the record id is read by the RDBMS 110 from the data file. The RDBMS 110 traverses the linked list, from node 280, to node 270. Node 270 is read by the RDBMS 110 and its Rid value is 0x00000054, wherein the most significant bit is 0, indicating that the record id represents a record id, and the actual record associated with the record id is read by the RDBMS 110 from the data file. Thereafter, the traverse terminates, because there are no further nodes in the linked list.

Inserting a Row in the Patricia Tree

Assume that the RDBMS 110 wants to add another record to table T (1, 32, 'p') and update the index represented by the Patricia tree. The RDBMS 110 will first search for (1, 32) in the Patricia tree and stops at node 250. It then reads the record, which is (1, 16, 'j'). The column values are then converted into a 2-column search key, which is (1, 16), for bitwise comparison, as shown below:
(1, 32)=>(0x80000001, 0x80000020)
(1, 16)=>(0x80000001, 0x80000010)

The first bit difference occurs in bit 26 of column 1, so the bitpos for (1, 32) is 0x0180001A. A new node in the tree is then created by the RDBMS 110. For any new node, either its left or right pointer must point to itself The RDBMS 110 recognizes that this node represents (1, 32) and the node has bitpos=0x0180001A. If the RDBMS 110 begins looking for (1, 32) starting at the new node, the right path will be taken (because bit 26 of column 1 is 1). Therefore, the tight path must point back to the node. The left path of the new node will point to node 250. Finally, the RDBMS 110 needs to fix up its parent node 260. The left path of node 260 should point to the new node, instead of node 250.

Suppose the RDBMS 110 inserts (1, 16, 'q'). The RDBMS 110 will search for (1, 16) in the Patricia tree. This time, the RDBMS 110 will find an existing (1, 16) in the tree and there are no bit-wise differences. Hence, a linked-list containing the two nodes of (1, 16) will be created. The Rid of node 250 will, however, be modified to the location of the head of the linked-list.

Performing a Bi-Directional Search

Using the structure of the Patricia tree, any indexes represented thereby can be traversed in both ascending and descending order, and on any key column. For example, the Patricia tree provides functionality effectively equivalent to the following four indexes, in the sense that the Patricia tree provides the same search capability:
CREATE INDEX IDX1 ON T (A ASC, B ASC)
CREATE INDEX IDX2 ON T (A ASC, B DESC)
CREATE INDEX IDX3 ON T (A DESC, B ASC)
CREATE INDEX IDX4 ON T (A DESC, B DESC)

That is, all these indexes are equivalent to the IDX index as follows:
IDX: CREATE INDEX IDX ON T (A ASC, B ASC)
wherein this CREATE statement generates a Patricia tree as described herein.

In other words, it is not necessary to create four different indexes for exploitation by the following queries:

| | |
|---|---|
| Query A: | SELECT * FROM T ORDER BY A ASC, B ASC |
| Query B: | SELECT * FROM T ORDER BY A ASC, B DESC |
| Query C: | SELECT * FROM T ORDER BY A DESC, B ASC |
| Query D: | SELECT * FROM T ORDER BY A DESC, B DESC |
| Query E: | SELECT * FROM T ORDER BY A ASC |
| Query F: | SELECT * FROM T ORDER BY A DESC |
| Query G: | SELECT * FROM T WHERE A = 2 ORDER BY B ASC |
| Query H: | SELECT * FROM T WHERE A = 2 ORDER BY B DESC |

The following describes how the index IDX, when it has the structure of the Patricia tree, can be exploited for Query G and Query H.

First, the RDBMS 110 is able to recognize that given (i) the predicate "A=2", and (ii) the ORDER BY requirement on column B, and conclude that the index IDX can be used to satisfy the ordering requirement without resorting of the resulting rows. That is because the first column (A) in the index is bound to a constant and the ordering requirement is on the next column after A.

Since only one column is bound, a single-column search key (2)=>(0x80000002) is formed. The search by the RDBMS 110 will start at the root node as usual, but this time, the nodes visited when the left (or right) path is taken are pushed onto a stack. This is because the left branch nodes always have values smaller than the right branch nodes regardless of scan direction. In the case of an ascending search and the left branch being taken, matched nodes can possibly exist on the right branch as well, so the node will be pushed onto the stack for further scanning on its right branch, and vice versa for descending scans.

Consider how the search is performed for Query G. The search by the RDBMS 110 starts at the root, and its left path will be taken. The default direction is ascending, so node 1e0 is pushed onto the stack, because column 0 (i.e., column A) is scanned in an ascending direction and column 0 of the search key is used to determine branching at node 1e0. The RDBMS 110 then visits nodes 1/0, 200, and 220. The bitpos at node 220 is 0x01800014. Column 1 (i.e., column B) of the search key does not exist, so the left path will be taken (because this is an ascending search) and node 220 will be pushed onto the stack. The RDBMS 110 then visits node 2e0. The bitpos at node 2e0 is 0x01800015. Column 1 of the search key does not exist, so the left path will be taken (because this is an ascending search) and node 2e0 will be pushed onto the stack. The search by the RDBMS 110 stops at node 220, as this node has already been visited. Therefore, (2, 128) will be returned by the RDBMS 110 as the first row found.

The search will continue by popping the nodes off of the stack. This procedure is known as backtracking. During backtracking, the right or left path will be taken for ascending or descending searches, respectively, and the searches will continue from there. Nodes 1e0, 220, and 2e0 are stacked during the previous tree traversal. Backtracking will start at node 2e0, and it will route back to 2e0 itself by taking the right path (as this is an ascending search on column 1), so (2, 1024) will be returned as the second row found.

Backtracking continues at node 220. Following the right branch of 220, it reaches node 200 which points to a linked list. The three instances of (2, 2048) in the linked list will be returned.

Finally, backtracking starts at node 1e0. During the search, the nodes 2a0, 2d0, and 240 will be pushed onto the stack and the search stops at node 240. Hence, (NULL, 0), (NULL, 16), and (NULL, NULL) will be returned in order, but these nodes do not match the search criteria, so these nodes will be discarded and are not returned for the query by the RDBMS 110.

Query H scans column 0 in ascending order by default and column 1 in descending order. The search key is still (0x80000002) and search starts at the root node. The search path and the stack's contents are the same as previous scan until it reaches node 220. Column 1 does not exist in the search key, so a bit-wise comparison is not carried out. Instead, the RDBMS 110 will take the right path as it is scanning column 1 in a descending manner this time. The node 220 will also be pushed onto the stack, because matched nodes may exist in the left branch, and the search visits them after the right branch scan is finished. The scan stops at node 200, and the duplicated values (2, 2048) are returned as the first three rows.

Nodes 1e0 and 220 were stacked during the previous tree traversal. Backtracking then continues the search at node 220, since node 220 is the first node popped off the stack. Since column 1 is searched in a descending manner and column 1 of the search key is used for branching at node 220, the left branch of node 220 is taken and node 2e0 is reached. The bitpos of node 2e0, which is 0x01800015, specifies column 1 is to be used, and column 1 is being scanned in descending order, so the right branch of node 2e0 is taken and node 2e0 is pushed onto the stack. The right pointer points back to 2e0 itself and (2, 1024) is returned. Node 2e0 is then popped from the stack, and its left branch is taken. Here, the search reaches node 220 and then stops at 220, because 220 was visited previously. Consequently, (2, 128) is then returned. Finally, node 1e0 is popped from the stack. During the search, the nodes 2a0, 2d0, and 240 are pushed onto the stack and the search stops at node 240. Hence, (NULL, NULL), (NULL, 16), and (NULL, 0) are returned, in order, but these nodes do not match the search criteria, so these nodes will be discarded and are not returned for the query by the RDBMS 110.

The query optimization that can be done by the RDBMS 110 far exceeds other advanced database systems in that all require indexes of different ordering have been created.

Logic of the Optimization Technique

Figure 5:
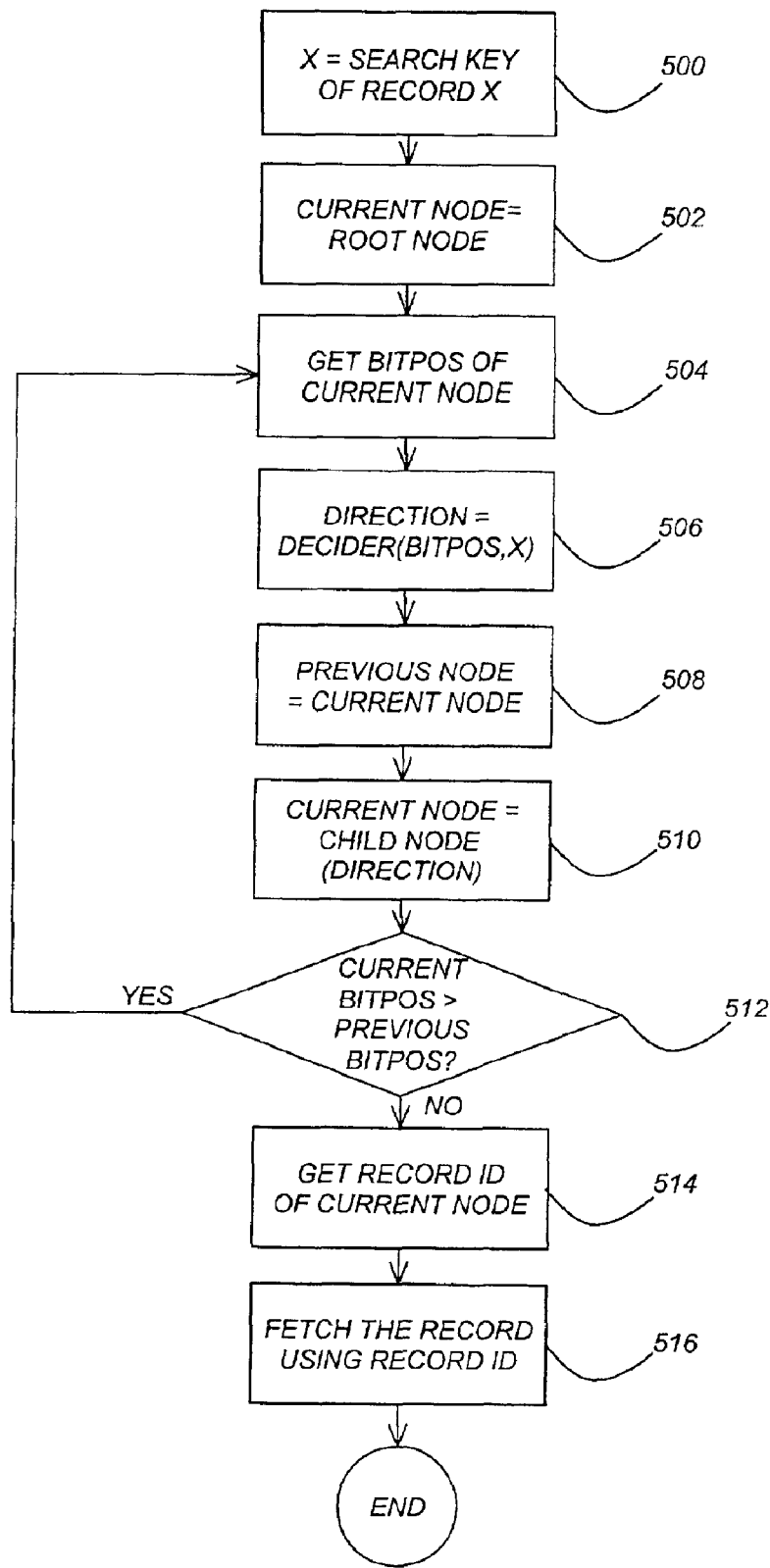
FIG. 5 is a flowchart illustrating a search method for the Patricia tree according to the preferred embodiment of the present invention.

FIG. 5 is a flowchart illustrating a search method for the Patricia tree according to the preferred embodiment of the present invention. This search method works for an n-column search key, represented as X (x0, x1, . . . , xn).

Block 500 represents the search key X being constructed from record X (also known as Rec_X).

Block 502 represents the root node of the Patricia tree being set as the current node, so that the search method begins at the root node.

Block 504 represents the bitpos being obtained from the current node.

Block 506 represents a Decider function being invoked as Direction=Decider(bitpos, X). The Decider function is described in FIG. 6. The parameters of the Decider function comprise the bitpos and the search key X. The Direction is a variable for storing either a left or right indicator value returned from the Decider function.

Block 508 represents the previous node being set as the current node.

Block 510 represents the current node being set to the child node of the current node based on the Direction variable (e.g., either the left or right child node of the current node based on Direction).

Block 512 is a decision block that determines whether the bitpos value of the current node is greater than the bitpos value of the previous node. If so, control transfers to Block 504; otherwise, control transfers to Block 514.

Block 514 represents the Record ID (Rid) being obtained from the current node.

Block 516 represents the record associated with the Rid obtained in Block 514 being fetched. Note that, if the search key X is not in the Patricia tree index, the search method will still return a record, so it is necessary to verify the record fetched is the desired record.

Figure 6:
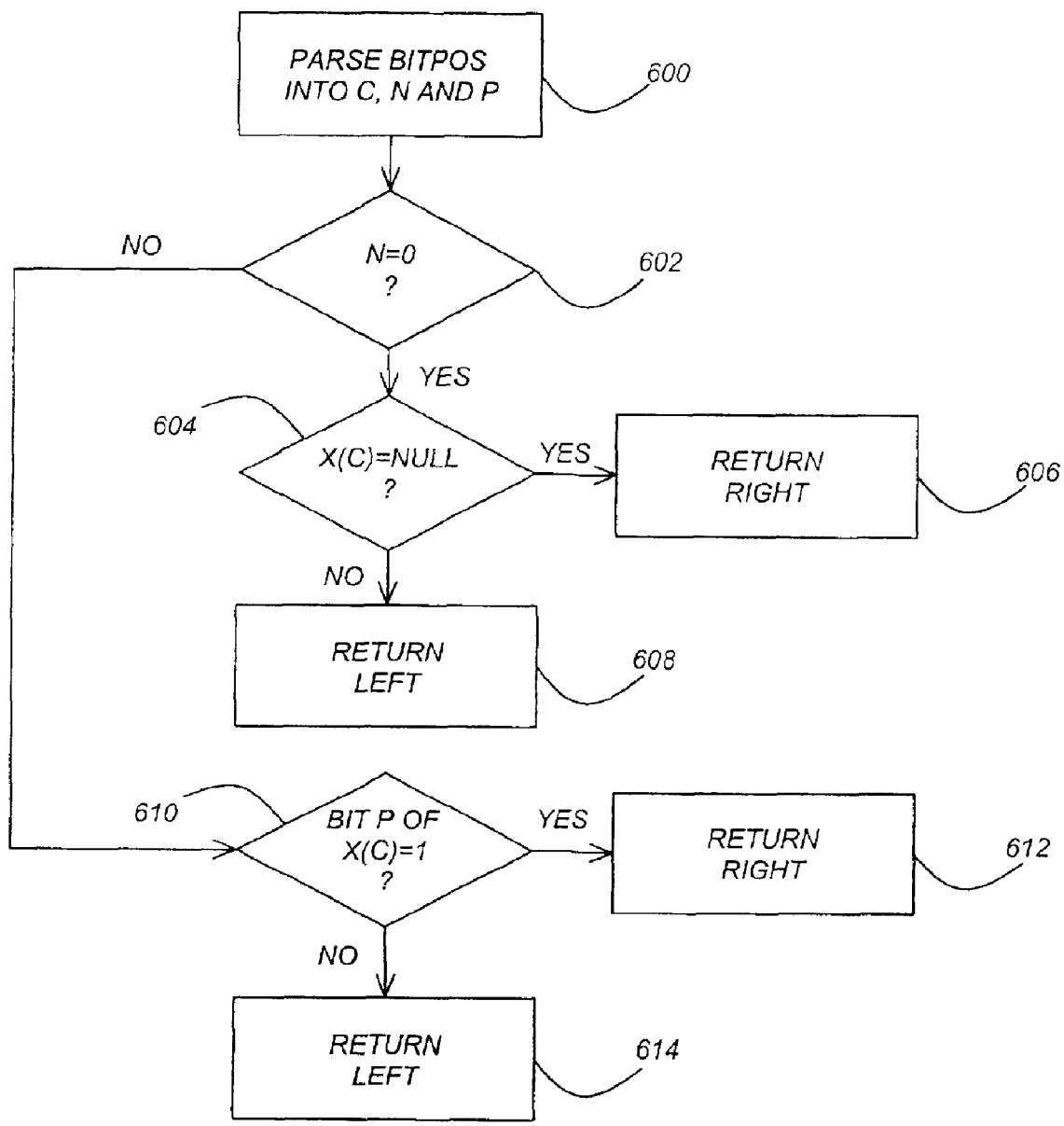
FIG. 6 is a flowchart illustrating the Decider function used by the search method for the Patricia tree according to the preferred embodiment of the present invention.

FIG. 6 is a flowchart illustrating the Decider function used by the search method for the Patricia tree according to the preferred embodiment of the present invention. As noted above, the Decider function is invoked as Direction=Decider (bitpos, X), where the parameters comprise the bitpos and the search key X, and the Direction is a variable for storing either a left or right indicator value returned from the Decider function.

Block 600 represents the bitpos being parsed into c (column), N (null comparison) and p (bit position) values, as described in FIG. 3.

Block 602 is a decision block that determines whether the N value is 0, indicating that a null comparison is necessary. If so, control transfers to Block 604; otherwise, control transfers to Block 610.

Block 604 is a decision block that determines whether the column c of the search key X is null. If so, control transfers to Block 606, which returns a "tight" direction indicator value; otherwise control transfers to Block 608, which returns a "left" direction indicator value.

Block 610 is a decision block that determines whether the bit position p of column c of the search key X is a "1". If so, control transfers to Block 612, which returns a "right" direction indicator value; otherwise, control transfers to Block 614, which returns a "left" direction indicator value.

Figure 7:
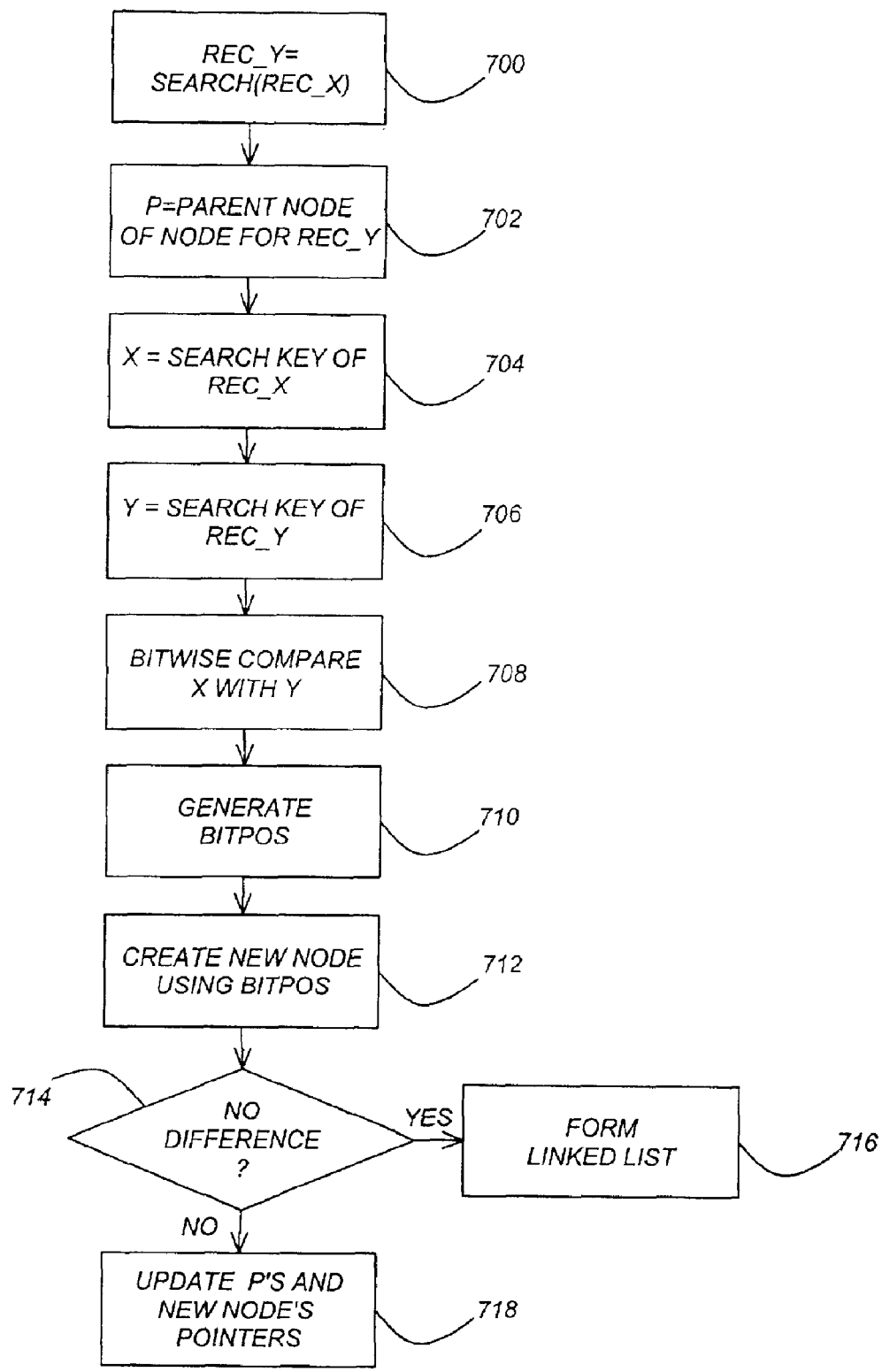
FIG. 7 is a flowchart illustrating an insert method for the Patricia tree according to the preferred embodiment of the present invention.

FIG. 7 is a flowchart illustrating an insert method for the Patricia tree according to the preferred embodiment of the present invention. This insert method works for an n-column value, represented as X (x0, x1, . . . , xn).

Block 700 represents the search method of FIG. 5 being invoked as a function Rec_Y=Search(Rec_X, wherein the parameter of the Search function comprises the record X (Rec_X) and Rec_Y is a variable for storing a record Y returned from the Search function.

Block 702 represents the variable P being set as the parent of the node representing Rec_Y.

Block 704 represents a search key X being constructed from Rec_X.

Block 706 represents a search key Y being constructed from Rec_Y.

Block 708 represents a bit-wise comparison being performed between X and Y.

Block 710 represents a bitpos being formed according to the first bit difference between X and Y.

Block 712 represents the creation of a new node using the bitpos formed in Block 706.

Block 714 is a decision block that determines whether there is no difference between X and Y. If so, control transfers to Block 716, which forms a linked list using the nodes representing the records Rec_X and Rec_Y associated with X and Y, respectively; otherwise, control transfers to Block 718.

Block 718 updates the new node, representing the record Re_X associated with X created in Block 708. In this Block, P will point to the new node instead of the node representing the record Rec_Y associated with Y. The Decider function of FIG. 6 is invoked as Direction=Decider(bitpos, X), where the parameters comprise the bitpos and the n-column value key X, and a left or right indicator value is stored in the Direction variable upon return from the Decider function. The Direction pointer of the new node is set to point to the new node itself, and the remaining child point of the new node is set to point to the node representing Y.

Figure 8A:
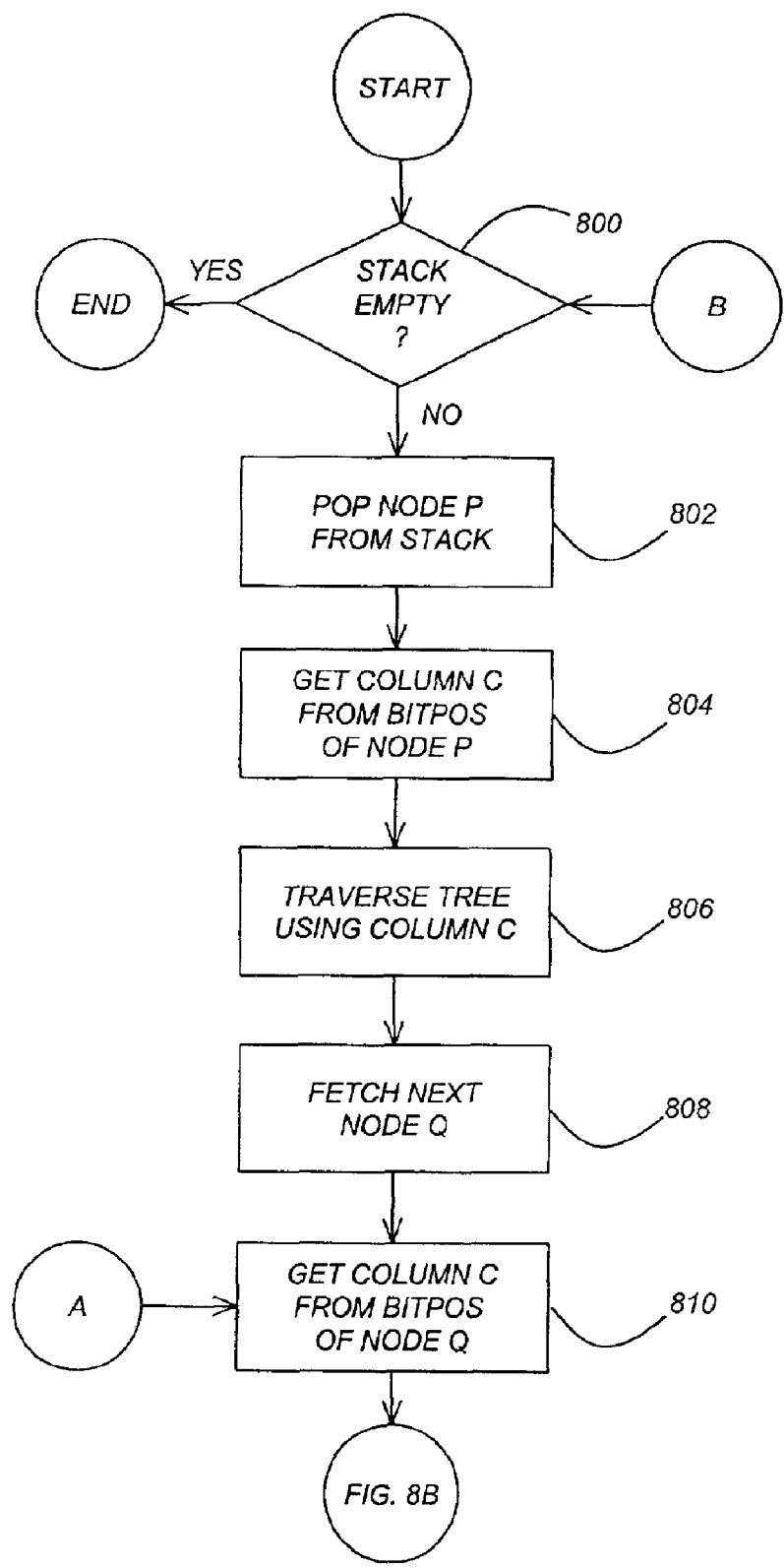
FIGS. 8A and 8B together are a flowchart illustrating a backtracking method for the Patricia tree according to the preferred embodiment of the present invention.
Figure 8B:
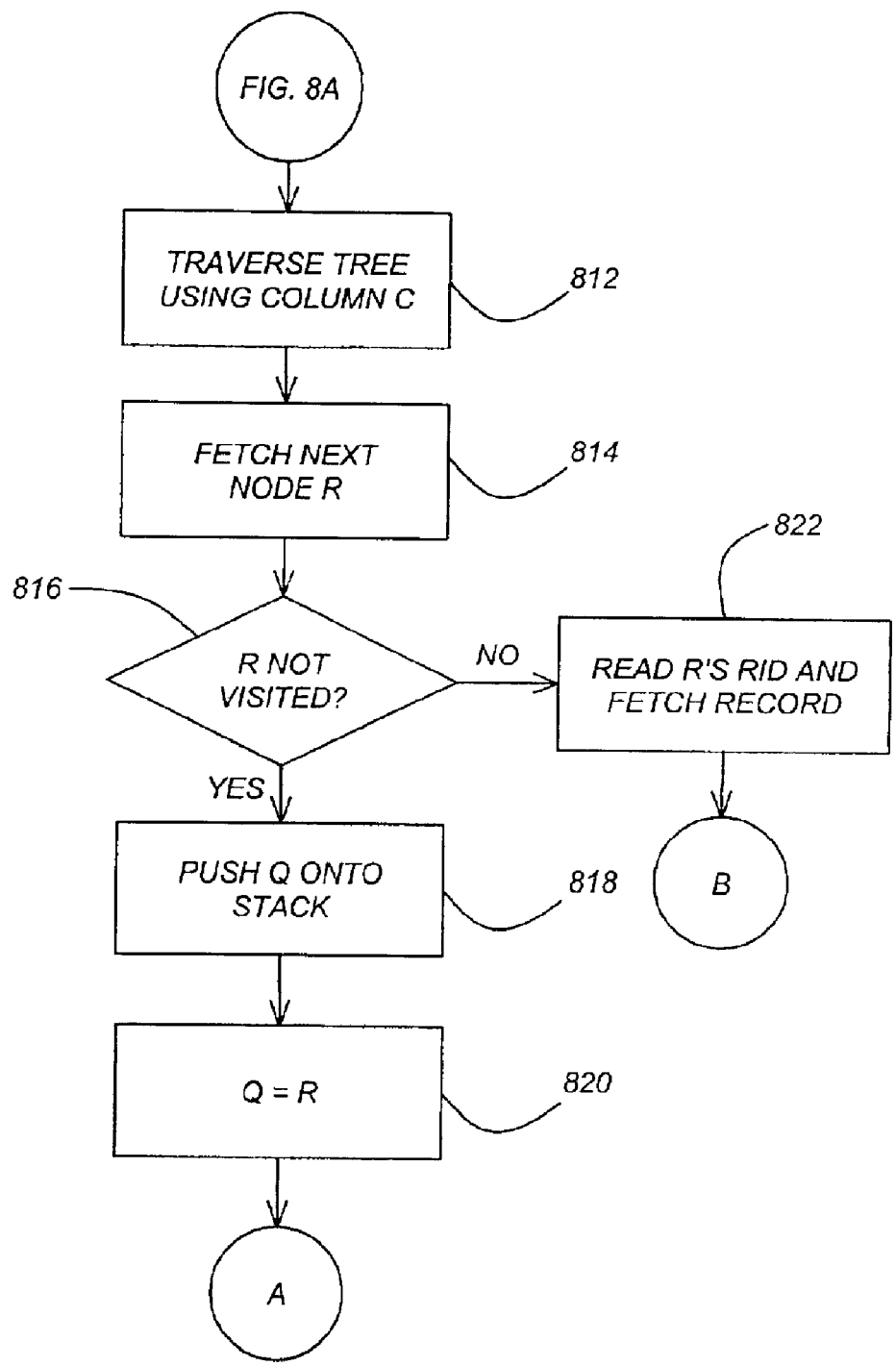

FIGS. 8A and 8B together are a flowchart illustrating a backtracking method for the Patricia tree according to the preferred embodiment of the present invention.

Block 800 is a decision block that determines whether the stack is empty. If so, the logic terminates; otherwise, control transfers to Block 802.

Block 802 represents a node P being popped from the stack.

Block 804 represents a column c being obtained from the bitpos value of node P.

Block 806 represents the Patricia tree being traverse according to the column c obtained from the bitpos value of node P. Specifically, the traverse takes a right or left branch of the tree, depending on whether an ascending or descending scan is being performed on column c, respectively.

Block 808 represents a next node Q being fetched from traversal of the Patricia tree.

Block 810 represents a column c being obtained from the bitpos value of node Q.

Block 812 represents the Patricia tree being traverse according to the column c obtained from the bitpos value of node Q. Specifically, the traverse takes a right or left branch of the tree, depending on whether an ascending or descending scan is being performed on column c, respectively.

Block 814 represents a next node R being fetched from traversal of the Patricia tree.

Block 816 is a decision block that determines whether node R has never been visited. If so, control transfers to Block 818; otherwise, control transfers to Block 822.

Block 818 represents node Q being pushed onto the stack.

Block 820 represents Q being set to R. Thereafter, control transfers to Block 810 via "A".

Block 822 represents node R's Rid being read and a fetch of the record identified by the Rid being performed. Thereafter, control transfers to Block 800 via "B".

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses an index structure for use by a database management system that comprises a variant of a Patricia tree, wherein each node stores a column value that identifies a specified column of the constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method for performing multi-column, bi-directional searches of an index in a database management system executed by a computer, comprising:
    (a) constructing an n-column search key; and
    (b) traversing the index using the constructed n-column search key, wherein the index comprises a tree having one or more nodes, each node stores a column value that identifies a specified column of the constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

2. The method of claim 1, further comprising inserting the constructed n-column search key into the tree.

3. The method of claim 1, wherein the tree is a variant of a Patricia tree.

4. The method of claim 1, wherein each node contains pointers to other nodes in the tree.

5. The method of claim 1, wherein the node identifies one or more values that are used by the database management system to access one or more associated records in a data file.

6. The method of claim 5, wherein the value represents a linked list of nodes.

7. The method of claim 5, wherein the value represents an identifier for the associated record in the data file.

8. The method of claim 1, wherein the traversing step further comprises backtracking during the traversing step.

9. A method for constructing an index for performing multi-column, bi-directional searches in a database management system executed by a computer, comprising:
    (a) creating an index for a data file managed by the database management system, wherein the index comprises a tree having one or more nodes, each node stores a column value that identifies a specified column of a constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

10. The method of claim 9, wherein the tree is a variant of a Patricia tree.

11. The method of claim 9, wherein each node contains pointers to other nodes in the tree.

12. The method of claim 9, wherein the node identifies one or more values that are used by the database management system to access one or more associated records in a data file.

13. The method of claim 12, wherein the value represents a linked list of nodes.

14. The method of claim 12, wherein the value represents an identifier for the associated record in the data file.

15. A system for performing multi-column, bi-directional searches of an index, comprising:
    a database management system executed by a computer, for:
    (a) constructing an n-column search key; and
    (b) traversing the index using the constructed n-column search key, wherein the index comprises a tree having one or more nodes, each node stores a column value that identifies a specified column of the constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

16. The system of claim 15, further comprising inserting the constructed n-column search key into the tree.

17. The system of claim 15, wherein the tree is a variant of a Patricia tree.

18. The system of claim 15, wherein each node contains pointers to other nodes in the tree.

19. The system of claim 15, wherein the node identifies one or more values that are used by the database management system to access one or more associated records in a data file.

20. The system of claim 19, wherein the value represents a linked list of nodes.

21. The system of claim 19, wherein the value represents an identifier for the associated record in the data file.

22. The system of claim 15, wherein the traversing further comprises backtracking during the traversing step.

23. A system for constructing an index for performing multi-column, bi-directional searches of an index, comprising:

(a) a database management system executed by a computer, for creating an index for a data file managed by the database management system, wherein the index comprises a tree having one or more nodes, each node stores a column value that identifies a specified column of a constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

24. The system of claim 23, wherein the tree is a variant of a Patricia tree.

25. The system of claim 23, wherein each node contains pointers to other nodes in the tree.

26. The system of claim 23, wherein the node identifies one or more values that are used by the database management system to access one or more associated records in a data file.

27. The system of claim 26, wherein the value represents a linked list of nodes.

28. The system of claim 26, wherein the value represents an identifier for the associated record in the data file.

29. An article of manufacture embodying logic for performing multi-column, bi-directional searches of an index in a database management system executed by a computer, comprising:

(a) constructing an n-column search key; and
(b) traversing the index using the constructed n-column search key, wherein the index comprises a tree having one or more nodes, each node stores a column value that identifies a specified column of the constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

30. The article of manufacture of claim 29, further comprising inserting the constructed n-column search key into the tree.

31. The article of manufacture of claim 29, wherein the tree is a variant of a Patricia tree.

32. The article of manufacture of claim 29, wherein each node contains pointers to other nodes in the tree.

33. The article of manufacture of claim 29, wherein the node identifies one or more values that are used by the database management system to access one or more associated records in a data file.

34. The article of manufacture of claim 33, wherein the value represents a linked list of nodes.

35. The article of manufacture of claim 33, wherein the value represents an identifier for the associated record in the data file.

36. The article of manufacture of claim 29, wherein the traversing step further comprises backtracking during the traversing step.

37. An article of manufacture embodying logic for constructing an index for performing multi-column, bi-directional searches in a database management system executed by a computer, comprising:

(a) creating an index for a data file managed by the database management system, wherein the index comprises a tree having one or more nodes, each node stores a column value that identifies a specified column of a constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

38. The article of manufacture of claim 37, wherein the tree is a variant of a Patricia tree.

39. The article of manufacture of claim 37, wherein each node contains pointers to other nodes in the tree.

40. The article of manufacture of claim 37, wherein the node identifies one or more values that are used by the database management system to access one or more associated records in a data file.

41. The article of manufacture of claim 40, wherein the value represents a linked list of nodes.

42. The article of manufacture of claim 40, wherein the value represents an identifier for the associated record in the data file.

43. An index structure, stored in a data storage device, for use by a database management system executed by a computer in performing multi-column, bi-directional searches, the index structure comprising a tree having one or more nodes, each node stores a column value that identifies a specified column of a constructed n-column search key that is used to determine a next path taken through the tree, a null value N that specifies whether a null value or an actual data value of the specified column of the constructed n-column search key is used to determine the next path taken through the tree, and a position value that specifies a portion of the specified column from the constructed n-column search key to be used to determine the next path taken through the tree when the actual data value of the specified column of the constructed n-column search key is used to determine the next path taken through the tree.

44. The index structure of claim 43, wherein the tree is a variant of a Patricia tree.

45. The index structure of claim 43, wherein each node contains pointers to other nodes in the tree.

46. The index structure of claim 43, wherein the node identifies one or more values that are used by the database management system to access one or more associated records in a data file.

47. The index structure of claim 46, wherein the value represents a linked list of nodes.

48. The index structure of claim 46, wherein the value represents an identifier for the associated record in the data file.

* * * * *